US011951738B2

(12) United States Patent
Machii

(10) Patent No.: US 11,951,738 B2
(45) Date of Patent: Apr. 9, 2024

(54) IMAGE RECORDING APPARATUS

(71) Applicant: BROTHER KOGYO KABUSHIKI KAISHA, Nagoya (JP)

(72) Inventor: Sota Machii, Ama (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 155 days.

(21) Appl. No.: 17/840,904

(22) Filed: Jun. 15, 2022

(65) Prior Publication Data

US 2022/0402267 A1 Dec. 22, 2022

(30) Foreign Application Priority Data

Jun. 21, 2021 (JP) ................................ 2021-102159

(51) Int. Cl.
*B41J 2/14* (2006.01)

(52) U.S. Cl.
CPC ...................................... *B41J 2/14* (2013.01)

(58) Field of Classification Search
CPC .... B41J 2/14; B41J 11/00214; B41J 11/00212
See application file for complete search history.

(56) References Cited

U.S. PATENT DOCUMENTS

| | | | | |
|---|---|---|---|---|
| 2009/0219342 | A1 | 9/2009 | Hishida et al. | |
| 2015/0124017 | A1 | 5/2015 | Aoyama | |
| 2018/0281453 | A1* | 10/2018 | Kondo | B41J 35/04 |
| 2019/0275810 | A1 | 9/2019 | Matsuki et al. | |

FOREIGN PATENT DOCUMENTS

| | | | |
|---|---|---|---|
| JP | 2009-208276 | A | 9/2009 |
| JP | 2011-73329 | A | 4/2011 |
| JP | 2013-129139 | A | 7/2013 |
| JP | 2015-85648 | A | 5/2015 |
| JP | 2019-151073 | A | 9/2019 |

* cited by examiner

*Primary Examiner* — Bradley W Thies
(74) *Attorney, Agent, or Firm* — Merchant & Gould P.C.

(57) ABSTRACT

There is provided a printer including a head configured to discharge a liquid onto a printing surface of a printing medium, the liquid being curable by applying energy; an energy applying unit; a moving device which relatively moves the head and the energy applying unit with respect to the printing medium; and a controller. The controller executes discharge of the liquid from the head onto the printing surface while relatively moving the head and the printing medium; application of first energy and second energy from the energy applying unit to the liquid, while relatively moving the energy applying unit and the printing medium; and decision of an added-up energy amount of the first energy applied to the liquid on the printing surface from the energy applying unit until the second energy is applied after the application of the first energy depending on a state of the printing surface.

8 Claims, 10 Drawing Sheets

IMAGE RECORDING APPARATUS

CROSS REFERENCE TO RELATED APPLICATION

The present application claims priority from Japanese Patent Application No. 2021-102159, filed on Jun. 21, 2021, the disclosure of which is incorporated herein by reference in its entirety.

BACKGROUND

The present disclosure relates to an image recording apparatus such as a printer.

For example, a liquid discharge apparatus is known as a known printer. A certain known liquid discharge apparatus is provided with a liquid discharge head which discharges a photocurable liquid onto a printing medium, and a light source unit which irradiates the liquid on the printing medium with light.

In the known liquid discharge apparatus described above, the liquid on the printing medium is cured by the light radiated from the light source, and the liquid is fixed to the printing medium. Thus, an image is printed. In this procedure, if the illuminance of the light is low on the printing medium, the liquid easily spreads on the printing medium before the liquid is cured. On this account, if the liquid is brought in contact with another liquid discharged onto the printing medium, then the liquids are mixed with each other, and the deterioration of the image quality is consequently caused by the bleeding or blurring.

On the other hand, if the illuminance of the light is high on the printing medium, the liquid is cured before the liquid sufficiently spreads. On this account, irregularities appear on the surface of the printing medium on account of cured matters of the liquid, and the diffused light is generated by the irregularities. Therefore, the deterioration of the image quality is consequently caused by the diffused light.

The present disclosure has been made taking the foregoing circumstances into consideration, an object of which is to provide a technique which contributes to suppress the deterioration of the image quality caused by the bleeding or blurring and the irregularities.

SUMMARY

According to an aspect of the present disclosure, there is provided a printer including: a head; an energy applying unit; a moving device and a controller. The head is configured to discharge a liquid onto a printing surface of a printing medium, the liquid being curable by applying energy. The energy applying unit is configured to apply energy to the liquid. The moving device is configured to relatively move the head and the energy applying unit with respect to the printing medium. The controller is configured to execute: causing the head to discharge the liquid onto the printing surface while relatively moving the head and the printing medium; causing the energy applying unit to apply first energy to the liquid so that the liquid is in a flow state in which the liquid has an increased viscosity and the liquid has fluidity, while relatively moving the energy applying unit and the printing medium; causing the energy applying unit to apply second energy to the liquid so that the liquid, to which the first energy has been applied, is cured, while relatively moving the energy applying unit and the printing medium; and determining an added-up energy amount of the first energy applied to the liquid on the printing surface from the energy applying unit until the second energy is applied after applying the first energy, depending on a state of the printing surface.

In the present disclosure, the energy for curing the liquid is applied in a divided manner at two stages. Further, the added-up energy amount of the first energy, which corresponds to the state of the printing surface, is applied to the liquid on the printing surface. Therefore, the difference in the flow state, which is brought about by the difference in the state of the printing surface, is reduced. Thus, it is possible to suppress the deterioration of the image quality caused by the bleeding or blurring of the liquid and the irregularities, irrelevant to the state of the printing surface.

DETAILED DESCRIPTION

Figure 1:
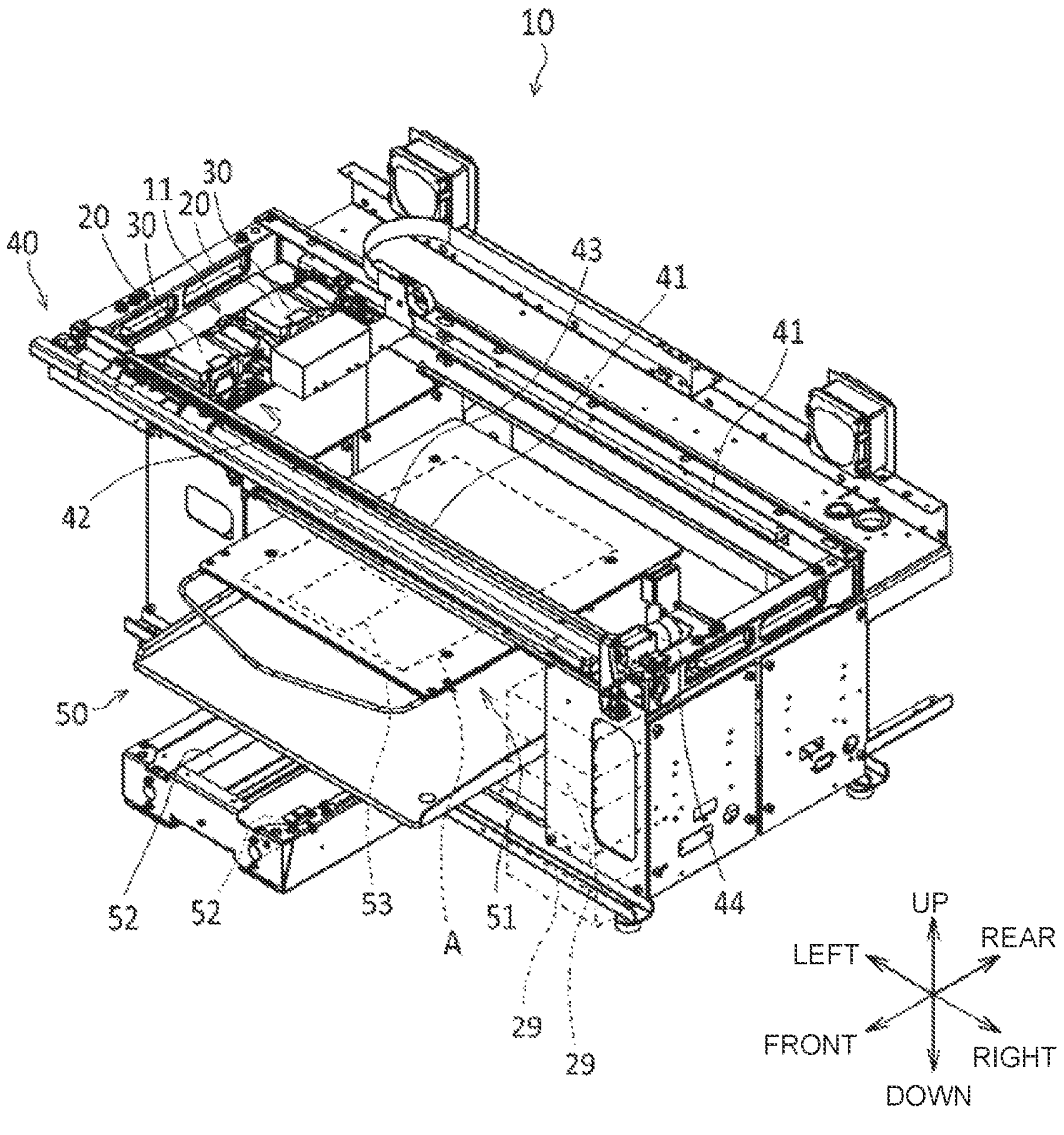
FIG. 1 is a perspective view of a printing apparatus.

An embodiment of the present disclosure will be specifically explained below with reference to the drawings. Note that in the following description, the same or corresponding elements are designated by the same reference numerals throughout all of the drawings, any duplicate explanation of which will be omitted.

First Embodiment

Configuration of Printing Apparatus

As shown in FIG. 1, a printing apparatus 10 according to a first embodiment of the present disclosure is, for example, an ink-jet printer which prints an image by discharging a liquid from a head 20 toward a printing medium A and applying energy from an energy applying unit 30 to the liquid. Note that the printing apparatus 10 is not limited to the ink-jet printer. The printing medium A is exemplified, for example, by cloth or fabric and a sheet of paper or the like. The liquid is a liquid such as an ink or the like which is curable by the applied energy.

Figure 2:
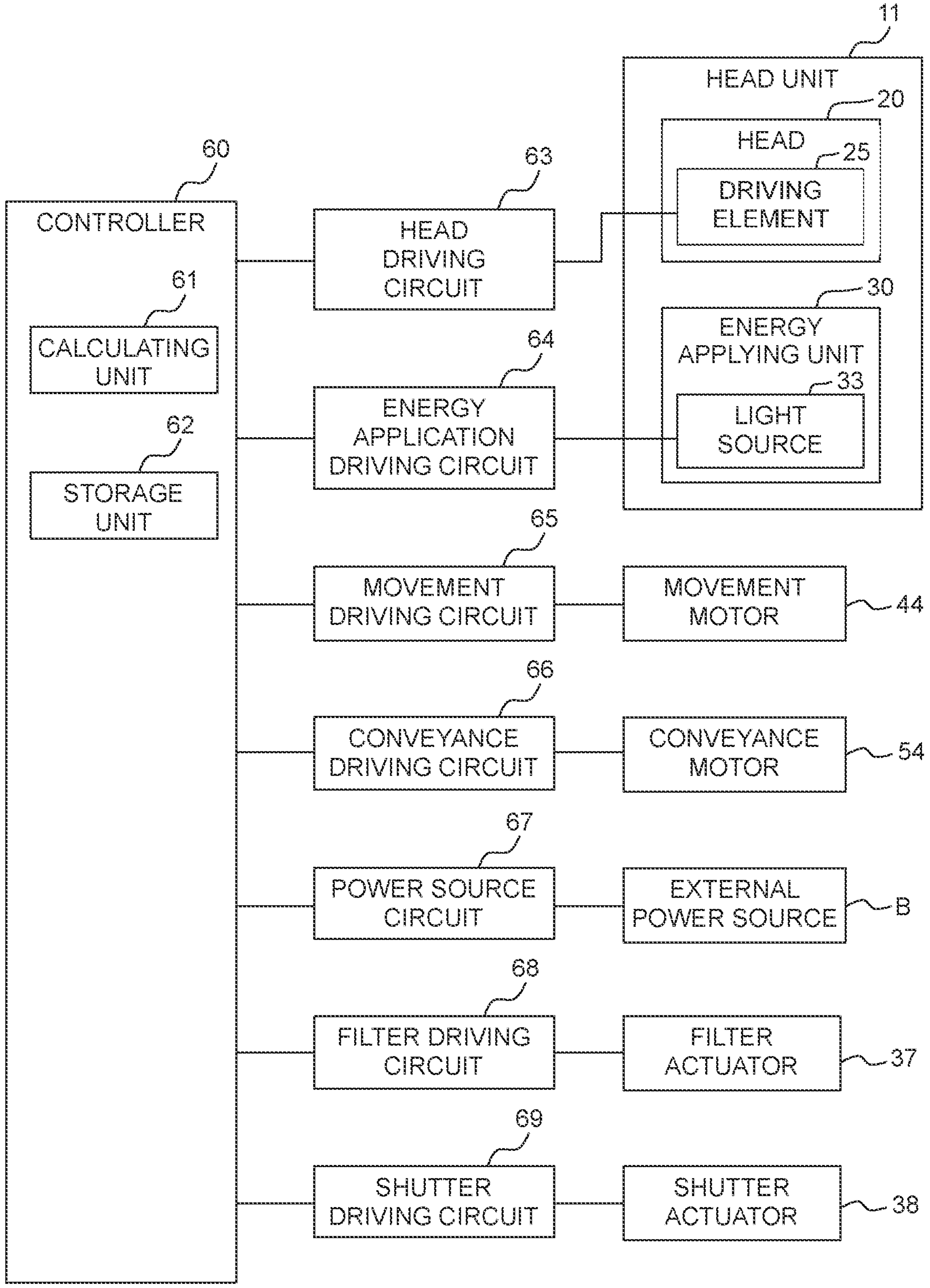
FIG. 2 is a functional block diagram illustrative of configuration of the printing apparatus shown in FIG. 1.

The printing apparatus 10 is provided with a head unit 11, a moving device 40, and a controller 60 (FIG. 2). The head unit 11 has a head 20 and an energy applying unit 30, and the ironing device 40 has a conveyor 50 and a carriage 42. Note that details of the controller 60 will be described later on. Further, the second direction, in which the head 20 and the energy applying unit 30 are aligned, is referred to as "left-right direction". The first direction, which intersects (for example, is orthogonal to) the second direction, is referred to as "front-back direction". The direction, which intersects (for example, is orthogonal to) the left-right direction and the front-back direction, is referred to as "upward-downward direction". However, the arrangement of the printing apparatus 10 is not limited thereto.

The moving device 40 has a pair of rails 41, a carriage 42, a belt 43, and a motor 44, and the moving device 40 moves the head unit 11 in the left-right direction. The pair of rails 41 are lengthy members which extend in the left-right direction. The pair of rails 41 are arranged in parallel to one another so that the head unit 11 is interposed therebetween in the front-back direction. The carriage 42 carries the head unit 11. The carriage 42 is supported movably in the left-right direction along the rails 41. The belt 43 is an endless belt which extends along the rail 41 in the left-right direction. The belt 43 is connected to the carriage 42, and the belt 43 is connected to the motor 44 via a pulley. The motor 44 drives the belt 43, and thus the carriage 42 is reciprocatively moved in the left-right direction along the rails 41. Accordingly, the moving device 40 relatively moves the head 20 and the energy applying unit 30 with respect to the printing medium A in the left-right direction.

The conveyor 50 has a stage 51, rails 52, a stage support stand 53, and a motor 54 (FIG. 2). The stage 51 has its upper surface which is opposed to a discharge surface 20*a* as the lower surface of the head 20 and a lower surface of the energy applying unit 30. The printing medium A is placed on an upper surface of the stage 51 which supports the printing medium A to prescribe the gap between the printing medium A and the head 20 in the upward-downward direction. The rails 52 extend in the front-back direction. The stage support stand 53 supports, for example, the stage 51. The stage support stand 53 is supported movably in the front-back direction along the rails 52. The stage support stand 53 is connected to the motor 54. The motor 54 drives the stage support stand 53, and thus the stage 51 is moved in the front-back direction. Accordingly, the conveyor 50 conveys the printing medium A, for example, frontwardly.

Configuration of Head Unit

Figure 3:
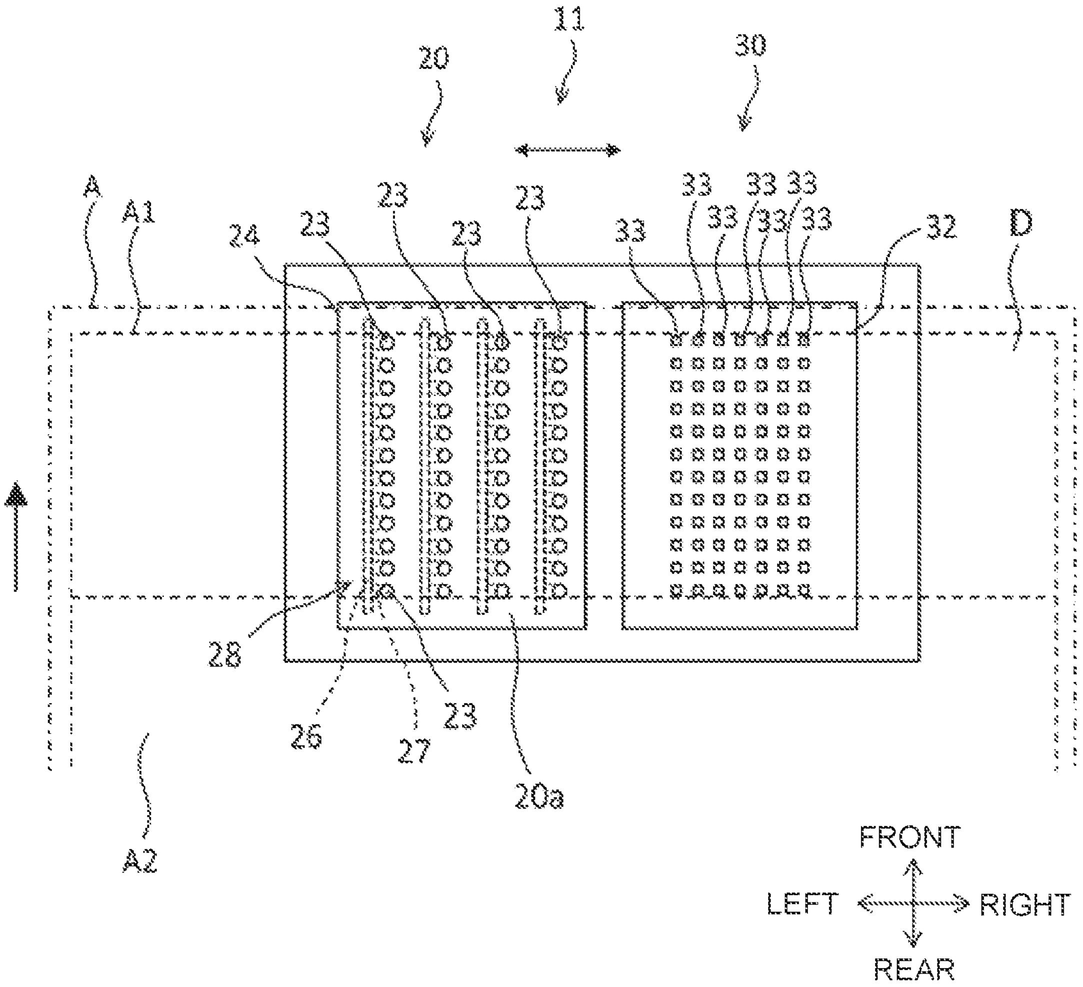
FIG. 3 is a schematic view as viewed from a lower position illustrative of a head unit shown in FIG. 1.

As shown in FIG. 3, the head 20 has a plurality of nozzles 23, a liquid flow passage 28, allow passage forming member 24, and a plurality of driving elements 25 (FIG. 2). The plurality of nozzles 23 are mutually aligned at equal intervals in the front-back direction to form nozzle arrays. The plurality of nozzle arrays are mutually aligned at equal intervals in the left-right direction.

The flow passage forming member 24 has, for example, a rectangular parallelepiped shape, and the nozzles 23 and the liquid flow passage 28 are formed therein. The nozzles 23 are open on the discharge surface 20*a* of the flow passage forming member 24. The liquid flow passage 28 is connected to a tank 29 (FIG. 1) and the nozzles 23, and the liquid flow passage 28 has a common flow passage 26 and a plurality of individual flow passages 27 therebetween. The common flow passage 26 is connected to the tank 29, and the common flow passage 26 extends in the front-back direction. The plurality of individual flow passages 27 are branched from the common flow passage 26. The individual flow passage 27 has its upstream end which is connected to the common flow passage 26 and its downstream end which is connected to the nozzle 23. Therefore, the liquid flows from the tank 29 to the common flow passage 26. The flow is divided into the individual flow passages 27 during the course in which the liquid flows in the front-back direction in the common flow passage 26. The liquid is supplied to the nozzles 23.

The driving element 25 is, for example, a piezoelectric element, and the driving element 25 is provided corresponding to the individual flow passage 27. The driving element 25 is driven so that the volume of the individual flow passage 27 is changed. Accordingly, the pressure to discharge the liquid from the nozzle 23 is applied to the liquid contained in the individual flow passage 27. Accordingly, the liquid is landed on the printing surface D of the printing medium A or the printing surface D on the printing medium A. Note that the printing surface D will be described later on.

The energy applying unit 30 is a device which applies the energy to the liquid on the printing surface D. As the energy applying unit 30, a light irradiation unit, which radiates ultraviolet light as the energy, will be explained below. In this case, a photocurable liquid, which is curable by the ultraviolet light, is used as the liquid.

However, the energy applying unit 30 is not limited to the light irradiation unit. For example, the energy applying unit 30 may be an electromagnetic wave generator which generates the energy based on an electromagnetic wave having a wavelength other than that of the ultraviolet light, including, for example, infrared light and microwave. In this case, a liquid, which is curable by the electromagnetic wave having the radiated wavelength, is used as the liquid.

Alternatively, the energy applying unit 30 may be a heater which applies the heat. The heater is exemplified, for example, by a radiation type heater, a warm air heater, and a contact type heater. In this case, a liquid such as a latex ink or the like, which is curable by the heat, is used as the liquid.

The energy applying unit 30 is arranged upstream from the head 20 in the direction in which the head 20 is moved while discharging the liquid. For example, the head 20 discharges the liquid when the head 20 is moved leftwardly, and the head does not discharge the liquid when the head 20 is moved rightwardly. In this case, the energy applying unit 30 is arranged on the right side which is the upstream from the head 20 in the movement direction in which the head 20 is moved leftwardly during the printing. The energy applying unit 30 radiates the light onto the liquid on the printing surface D while moving to follow the head 20 which discharges the liquid onto the printing surface D.

The energy applying unit 30 has a plurality of light sources 33 and a circuit board 34 on which the light sources 33 are carried. The circuit board 34 is composed of, for example, an insulating material, and the circuit board 34 has a rectangular flat plate shape. The circuit board 34 has a lower surface on which the light sources 33 are carried. The light source 33 is an energy source which radiates the light as the energy. The light source 33 is, for example, a light emitting element such as LED or the like. The light source 33 is driven by the controller 60 to emit the light (for example, ultraviolet ray) which cures the liquid discharged from the nozzle 23. The plurality of light sources 33 are aligned in the front-back direction to constitute light source arrays. The plurality of light source arrays are aligned while providing spaces in the left-right direction.

Configuration of Controller

As shown in FIG. 2, the controller 60 has a calculating circuit 61 and a memory 62. The memory 62 is a memory which is accessible by the calculating circuit 61, and the memory 62 is composed of, for example, RAM and ROM. RAM temporarily stores various data including, for example, the printing data. ROM stores programs in order to perform various data processings. Note that the controller 60 may be a single controller which performs the centralized control, or the controller 60 may include a plurality of controllers which perform the decentralized control. Further, the program may be stored in any other storage medium other than the memory 62. Further, the program may be stored in a single storage medium, or the program may be stored in a plurality of storage media in a divided manner.

The calculating circuit 61 is composed of a processor such as CPU or the like and a circuit such as an integrated circuit or the like including, for example, ASIC. The calculating circuit 61 executes the program stored in ROM, and thus the controller 60 performs the printing process by controlling the driving element 25, the light sources 33, the motor 44, and the motor 54.

In this case, the controller 60 is connected to the driving element 25 of the head 20 via a head driving circuit 63, and the controller 60 controls the driving of the driving element 25. Accordingly, the discharge of the liquid from the head 20 by the driving element 25 is controlled. Further, the controller 60 is connected to the light sources 33 of the energy applying unit 30 via an energy application driving circuit 64, and the controller 60 controls the driving of the light sources 33. Accordingly, turning ON and turning OFF of the light sources 33 are controlled.

The controller 60 is connected to the motor 44 via a movement driving circuit 65, and the controller 60 controls the driving of the motor 44. The controller 60 is connected to a motor 54 via a conveyance driving circuit 66, and the controller 60 controls the driving of the motor 54. Accordingly, for example, the driving, the stop, and the rotation speed are controlled for the motor 44 and the motor 54.

The controller 60 is connected to an external power source B such as a commercial power source or the like via a power source circuit 67. The power source circuit 67 converts the DC voltage supplied from the external power source B into the output voltages for the respective parts including, for example, the driving element 25, the light sources 33, the motor 44, and the motor 54 of the printing apparatus 10. The power source circuit 67 supplies the electric power at the output voltages to the respective parts. The supply of the electric power is controlled by the controller 60.

Printing Process

In the printing apparatus 10 as described above, the controller 60 acquires the printing data, and the controller 60 executes the printing process on the basis of the printing data. The printing data includes the image data (for example, raster data) which represents the image to be printed on the printing medium A. The printing data may be stored in the memory 62, or the printing data may be acquired from any external apparatus or device including, for example, the network, the computer, and the storage medium.

The controller 60 controls the motor 44 to execute the movement action for moving the head unit 11 in the left-right direction. Further, the controller 60 controls the driving element 25 to execute the discharge action for discharging the liquid from the head 20. Further, the controller 60 controls the light sources 33 to execute the radiation action for radiating the light from the light sources 33. Further, the controller 60 controls the motor 54 to execute the conveyance action for conveying the printing medium A in the front-back direction. Then, the printing apparatus 10 alternately repeats the scanning and the conveyance action, the scanning including the movement action, the discharge action, and the radiation action. Thus, the printing apparatus 10 progressively advances the printing process.

Scanning

In the scanning of the printing process, the controller 60 allows the head 20 to discharge the liquid therefrom onto the printing surface D, while relatively moving the head 20 and the printing medium A. The controller 60 allows the energy applying unit 30 to apply the first energy therefrom to the liquid so that the liquid is in the flow state in which the viscosity thereof is raised but the liquid has the fluidity, while relatively moving the energy applying unit 30 and the printing medium A. The controller 60 allows the energy applying unit 30 to apply the second energy therefrom to the liquid so that the liquid, to which the first energy has been applied, is cured, while relatively moving the energy applying unit 30 and the printing medium A. The controller 60 decides the added-up energy amount of the first energy to be applied to the liquid on the printing surface D from the energy applying unit 30 until the second energy is applied after the application of the first energy, depending on the state of the printing surface D.

The added-up energy amount of the first energy is the product of the first energy which is applied to the liquid per unit area and per unit time and the time for which the first energy is applied to the liquid. The added-up energy amount of the second energy is the product of the second energy which is applied to the liquid per unit area and per unit time and the time for which the second energy is applied to the liquid.

For example, when the energy is applied to the liquid by radiating the light, then the first energy is the energy applied to the liquid by radiating the light having a first illuminance ($mW/cm^2$), and the second energy is the energy applied to the liquid by radiating the light having a second illuminance ($mW/cm^2$). Further, the added-up energy amount of the first energy is the added-up light amount ($mJ/cm^2$) obtained by multiplying the illuminance (first illuminance) ($mW/cm^2$) of the light which is radiated onto the liquid, by the time (s) for which the light having the first illuminance is radiated onto the liquid. In the following description, the added-up energy amount of the first energy is referred to as "first added-up light amount". The added-up energy amount of the second energy is the added-up light amount ($mJ/cm^2$) obtained by multiplying the illuminance (second illuminance) ($mW/cm^2$) of the light which is radiated onto the liquid, by the time(s) for which the light having the second illuminance is radiated onto the liquid. In the following description, the added-up energy amount of the second energy is referred to as "second added-up light amount".

For example, the first illuminance is not less than 10 and not more than 500 ($mW/cm^2$), and the first illuminance can be not less than 10 and not more than 100 ($mW/cm^2$). The second illuminance is not less than 1000 and not more than 10000 ($mW/cm^2$), and the second illuminance can be not less than 1000 and not more than 3000 ($mW/cm^2$). The first added-up light amount is not less than 0.6 and not more than 30 ($mJ/cm^2$), and the first added-up light amount can be not less than 0.6 and not more than 5.9 ($mJ/cm^2$). The second added-up light amount is not less than 60 and not more than 600 ($mJ/cm^2$), and the second added-up light amount can be not less than 60 and not more than 190 ($mJ/cm^2$).

The first added-up light amount is the energy which raises the viscosity of the liquid but which provides such a flow state that the liquid has the fluidity. The first added-up light amount is decided depending on the state of the printing surface D. The first added-up light amount is smaller than the added-up light amount which is required to bring about such a temporary cured state that the surface of the liquid is cured and the inside thereof is flowable, and the first added-up light amount is smaller than the added-up light amount which is required to bring about such a permanent cured state that the entire liquid is cured. Further, the second added-up light amount is the energy which is required to permanently cure the liquid in the flow state. The second added-up light amount is previously decided.

In the flow state, the viscosity of the liquid is higher than the viscosity of the liquid provided before the first added-up light amount is applied, for example, when the liquid is landed on the printing surface D. Further, in this state, the liquid does not arrive at the temporary cured state, in which the surface of the liquid is flowable. For example, the viscosity of the liquid, which is provided before the application of the first added-up light amount, is not less than 5 and not more than 30 (mPa·s). On the other hand, the viscosity of the liquid, which is in the flow state after the application of the first added-up light amount, is not less than 10000 and not more than 100000 (mPa·s).

As shown in FIGS. 4A to 4D, the printing surface D includes any one surface of the surface of the printing medium A, the surface of the coating E on the printing medium A, and the surface of the layer opposed to the head 20 of the layers C1, C2 of the liquid in the flow state of one layer or a plurality of layers on the printing medium A.

Figure 4A:
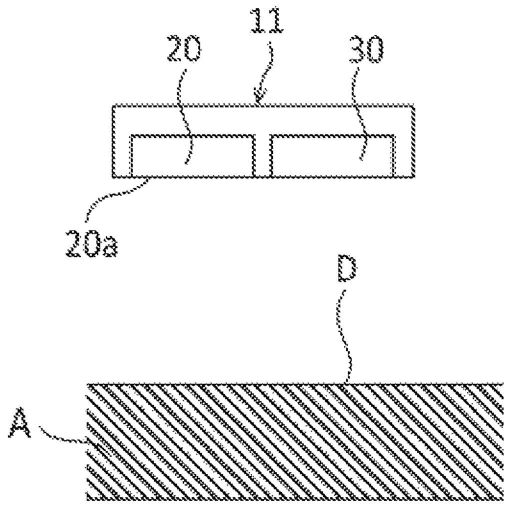
FIG. 4A is a drawing schematically illustrative of a head and a surface of a printing medium as a printing surface.

Specifically, as shown in FIG. 4A, when the coating E and the liquid layers C1, C2 are not formed on the printing medium A, the surface of the printing medium A appears on the outside, and the surface of the printing medium A is opposed to the discharge surface 20*a* of the head 20 and the light sources 33 of the energy applying unit 30, then the printing surface D is the surface of the printing medium A. In this case, the liquid is discharged from the head 20 and landed on the surface of the printing medium A as the printing surface D, and the light having the first illuminance is radiated onto the liquid on the surface of the printing medium A from the energy applying unit 30. Accordingly, as shown in FIG. 4C, the liquid layer C1 in the flow state is formed on the printing medium A.

Figure 4B:
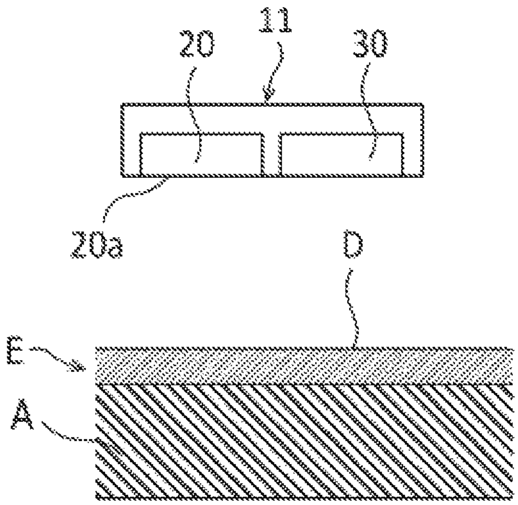
FIG. 4B is a drawing schematically illustrative of the head and a surface of a coating as a printing surface.

Further, as shown in FIG. 4B, when the surface of the printing medium A is covered with the coating E, the surface of the coating E appears on the outside, and the surface of the coating E is opposed to the discharge surface 20*a* of the head 20 and the light sources 33 of the energy applying unit 30, then the printing surface D is the surface of the coating E. In this case, the liquid is discharged from the head 20 and landed on the surface of the coating E as the printing surface D, and the light having the first illuminance is radiated onto the liquid on the surface of the coating E from the energy applying unit 30. Accordingly, the liquid layer in the flow state is formed on the coating E.

Figure 4C:
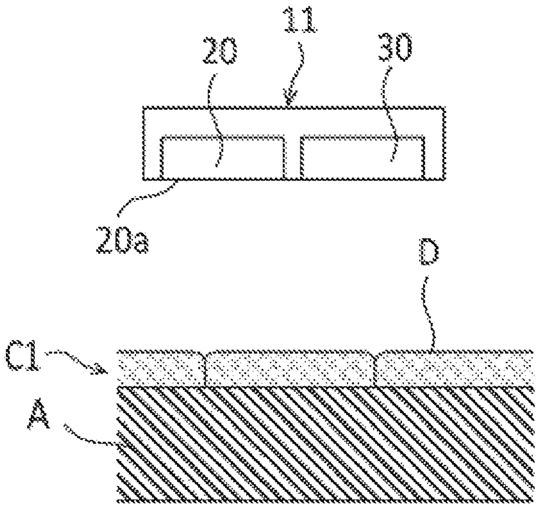
FIG. 4C is a drawing schematically illustrative of the head and a surface of a first liquid layer as a printing surface.
Figure 4D:
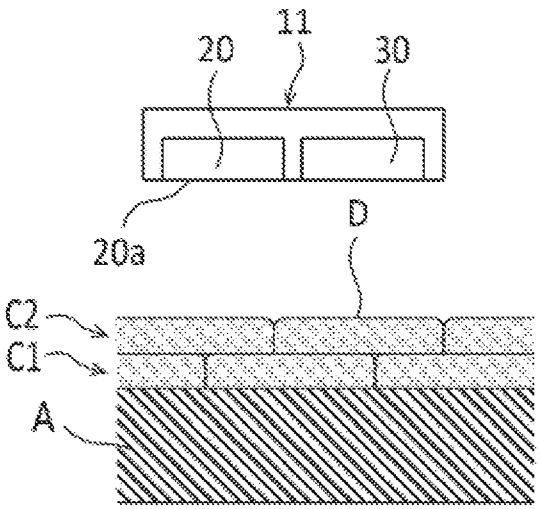
FIG. 4D is a drawing schematically illustrative of the head and a surface of a second liquid layer as a printing surface.

Further, as shown in FIG. 4C, when the surface of the printing medium A is covered with one layer of the liquid layer C1, the surface of the liquid layer C1 appears on the outside, and the surface of the liquid layer C1 is opposed to the discharge surface 20*a* of the head 20 and the light sources 33 of the energy applying unit 30, then the printing surface D is the surface of the liquid layer C1. In this case, the liquid is discharged from the head 20 and landed on the surface of the liquid layer C1 as the printing surface D, and the light having the first illuminance is radiated onto the liquid landed on the surface of the liquid layer C1 from the energy applying unit 30. Accordingly, as shown in FIG. 4D, the liquid layer C2 in the flow state is formed on the liquid layer C1. Note that when the surface of the printing medium A is covered with the coating E, and the surface of the coating E is covered with one layer of the liquid layer C1, then the surface of the liquid layer C1 may be used as the printing surface D.

Further, as shown in FIG. 4D, the surface of the printing medium A is covered with a plurality of layers (for example, two layers) of the liquid layers C1, C2 in the flow state, the surface of the liquid layer C2 stacked on the liquid layer C1 appears on the outside, and the surface of the liquid layer C2 is opposed to the discharge surface 20*a* of the head 20 and the light sources 33 of the energy applying unit 30. In this case, the surface of the liquid layer C2 disposed farthest from the printing medium A in the upward-downward direction is used as the printing surface D, the liquid layer C2 being included in the liquid layers C1, C2. Accordingly, the liquid is discharged from the head 20 and landed on the surface of the liquid layer C2 as the printing surface D, and the light is radiated onto the liquid landed on the surface of the liquid layer C2 from the energy applying unit 30. Accordingly, the liquid layer in the flow state is formed on the liquid layer C2. Note that when the surface of the printing medium A is covered with the coating E, and the surface of the coating E is covered with the plurality of liquid layers C1, C2, then the surface of the liquid layer C2 may be used as the printing surface D.

When the printing surface D is the surface of the printing medium A, the state of the printing surface D changes depending on the quality of material of the printing medium A. When the printing surface D is the surface of coating E on the printing medium A, the state of the printing surface D changes depending on the quality of material of the coating E. When the printing surface D is the surface of the liquid layer C1, C2 on the printing medium A, the state of the printing surface D changes depending on the quality of material of the liquid layer C1, C2.

The quality of material includes, for example, the material and the surface roughness of the printing medium A, the coating E, or the liquid layers C1, C2 for constructing the printing surface D, which affects the easiness of the spread of the liquid on the printing surface D. The easiness of the spread of the liquid on the printing surface D differs depending on the state of the printing surface D. Therefore, the first added-up light amount differs to provide the flow state of the liquid on the printing surface D.

As described above, the first added-up light amount is the product of the first illuminance and the radiation time of the light onto the liquid. The radiation time is decided by the predetermined movement speed of the energy applying unit 30, and hence the radiation time is previously determined. On this account, the first added-up light amount is decided depending on the first illuminance. In view of the above, the relationship between the state of the printing surface D and the first illuminance is previously stored in the memory 62. The controller 60 acquires the state of the printing surface D from the memory 62 or the external device. If the first illuminance, which corresponds to the state of the printing surface D, is found on the basis of the predetermined relationship, the first added-up light amount is decided by the first illuminance.

In this context, the first added-up light amount, which is applied to the liquid on the printing surface D having the state of the first state, is larger than the first added-up light amount which is radiated onto the liquid on the printing surface D in the second state as the state in which the liquid hardly spreads as compared with the printing surface D in the first state. For example, the printing surface D in the first state is the surface of the printing medium A having the quality of material of, for example, acrylic resin or glass. The printing surface D in the second state is the surface of the coating E having the quality of material of, for example, the white ink coating E applied onto the printing medium A.

In this case, the controller 60 operates such that the first added-up light amount, which is provided for the liquid on the printing surface D in the first state, is made larger than the first added-up light amount which is provided for the liquid on the printing surface D in the second state. Accordingly, the more easily the liquid spreads on the printing surface D, the larger the first added-up light amount is.

Accordingly, on the printing surface D in the first state in which the liquid easily spreads, the spread of the liquid can be reduced in the flow state on the printing surface D in the first state by applying the large first added-up light amount to the liquid. It is possible to suppress the deterioration of the image quality caused by the bleeding or blurring of the liquid. On the other hand, on the printing surface D in the second state in which the liquid hardly spreads, the irregularities of the liquid can be reduced in the flow state on the printing surface D in the second state by applying the small first added-up light amount to the liquid. It is possible to suppress the deterioration of the image quality caused by the irregularities of the liquid.

Further, the first added-up light amount, which corresponds to the state of the printing surface D, is applied to the liquid on the printing surface D, and the liquid is in the flow state. Accordingly, the difference is reduced in relation to the liquid in the flow state depending on the state of the printing surface D. It is possible to obtain the liquid in the uniform flow state irrelevant to the state of the printing surface D.

Then, the controller 60 changes the number of the light sources 33 to be turned OFF when the light at the first illuminance is applied, depending on the decided first added-up light amount. In this case, the plurality of light sources 33 are the light-emitting elements for radiating the light mutually having the same intensity. The controller 60 controls the light sources 33 by means of the energy application driving circuit 64 so that the electric power is supplied to the light sources 33 to turn ON the light sources 33 or the electric power supply to the light sources 33 is stopped to turn OFF the light sources 33.

The more easily the liquid spreads on the printing surface D, the more decreased the number of the light sources 33 to be turned OFF in the energy applying unit 30 is, the more increased the number of the light sources 33 to be turned ON is. Accordingly, the first illuminance of the light coming from the energy applying unit 30 is increased, and the first added-up light amount applied to the liquid is increased. In this way, it is possible to easily change the first added-up light amount by turning ON or turning OFF the light sources 33. Further, the controller 60 turns ON or turns OFF the light sources 33 so that the light sources 33 to be turned ON in the energy applying unit 30 are uniformly arranged. Accordingly, the uniform light is radiated from the energy applying unit 30 onto the liquid.

Method for Controlling Printing Apparatus

Figure 5:
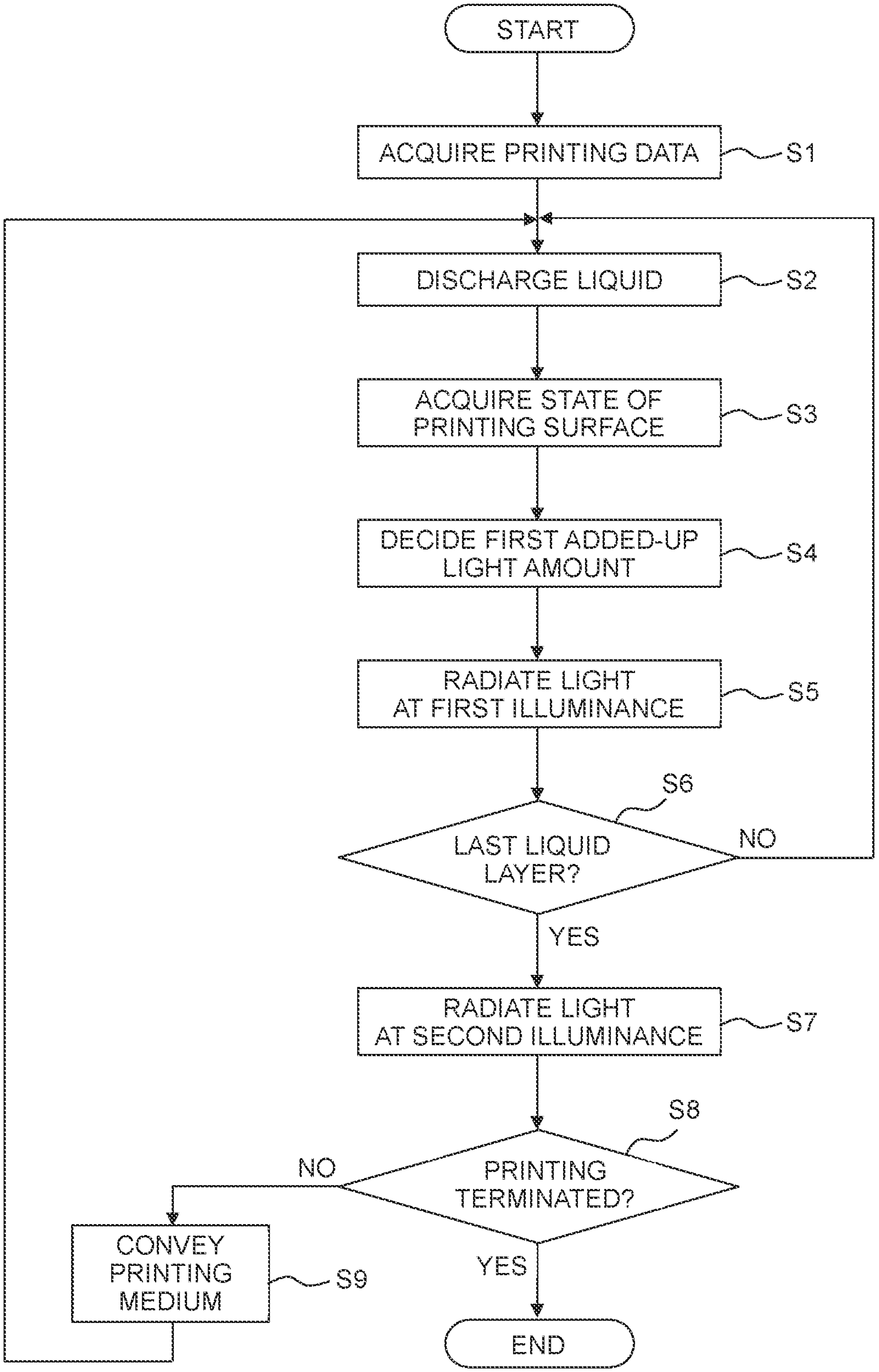
FIG. 5 is a flow chart illustrative of an exemplary control method for controlling the printing apparatus.

The method for controlling the printing apparatus 10 is executed by the controller 60 in accordance with, for example, a flow chart shown in FIG. 5. In the exemplary case shown in FIGS. 3 and 4A, the controller 60 acquires the printing data. (Step S1), and the controller 60 allows the head 20 to discharge the liquid therefrom while moving the head 20 leftwardly on the basis of the printing data (Step S2). Accordingly, as shown in FIGS. 3 and 4A, the liquid is landed on the opposing area A1 as the printing surface D of the surface of the printing medium A opposed to the discharge surface 20*a* of the moving head 20.

Then, the controller 60 acquires the state of the surface of the printing medium A as the state of the printing surface D (Step S3), and the controller 60 acquires the first illuminance corresponding to this state on the basis of the predetermined relationship. The first added-up light amount is decided by the first illuminance and the predetermined radiation time (Step S4).

The controller 60 allows the energy applying unit 30 to radiate the light at the first illuminance therefrom while moving the energy applying unit 30 leftwardly while following the head 20 (Step S5). Accordingly, as shown in FIG. 4C, the first added-up light amount corresponding to the state of the printing surface D is given to the liquid on the printing surface D, and the first liquid layer C1 is provided as the liquid layer in the flow state in which the viscosity thereof is raised but the layer has the fluidity.

Figure 6A:
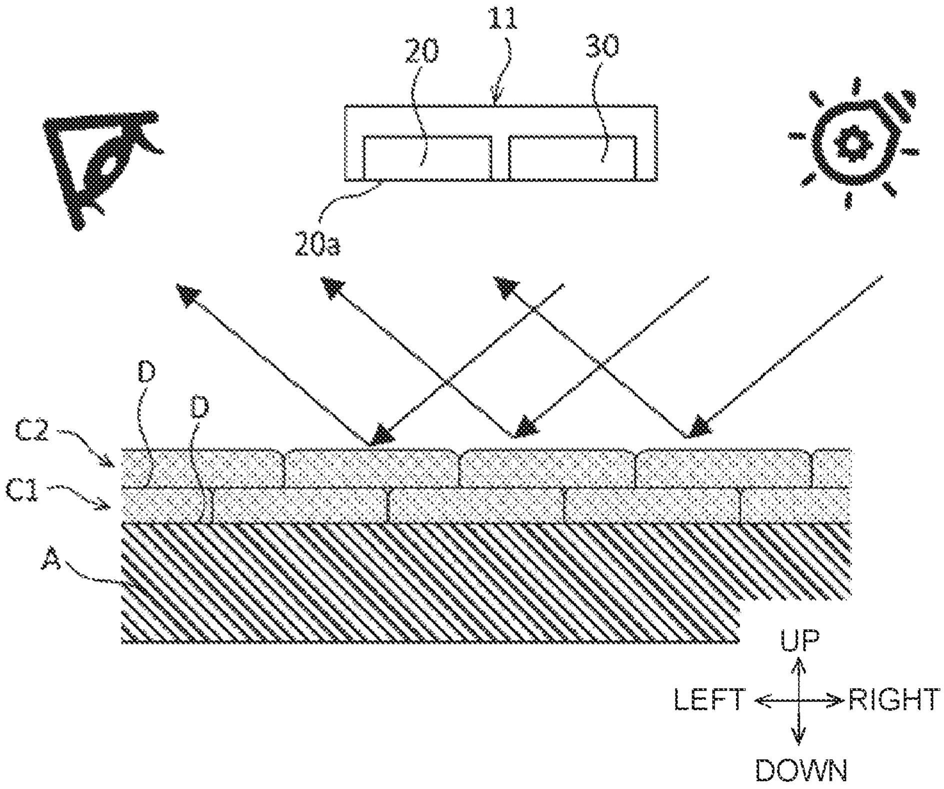
FIG. 6A is a sectional view schematically illustrative of the printing medium on which the first liquid layer and the second liquid layer are formed.
Figure 6B:
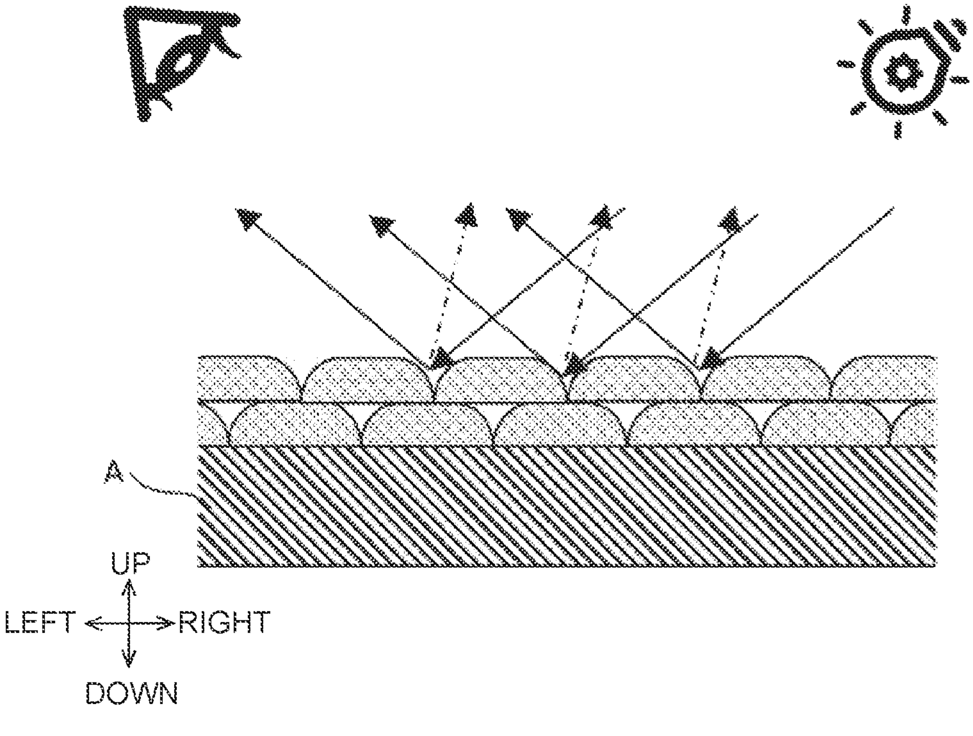
FIG. 6B is a sectional view schematically illustrative of the printing medium on which a permanently cured liquid layer is formed on a temporarily cured liquid layer.

As shown by the first liquid layer C1 in the flow state in FIG. 6A, the liquid has the protruding height in the upward direction, the protruding height being lower than that of the liquid in the temporary cured state shown in FIG. 6B, wherein the gentle curve provides the irregularities of the first liquid layer C1 which are gentler than those of the layer based on the liquid in the temporary cured state. Further, the viscosity of the liquid of the first liquid layer C1 is raised as compared with the viscosity provided immediately after the landing of the liquid. Therefore, the spread is suppressed. As for the liquid domains which are adjacent to one another in the first liquid layer C1, the mutually adjoining liquid domains are hardly connected to one another as compared with the liquid provided immediately after the landing. The liquid is hardly subjected to the bleeding or blurring.

In this context, the more easily the liquid spreads on the printing medium A, the larger the first added-up light amount is. Therefore, it is contemplated to improve the balance between the reduction of the irregularities and the reduction of the bleeding or blurring. Further, the first added-up light amount, which corresponds to the state of the printing surface D, is applied to the liquid on the printing surface D. Therefore, the difference in the flow state, which would be otherwise caused by the difference in the state of the printing surface D, is reduced. The first liquid layer C1 in the flow state is formed on the printing surface D irrelevant to the state of the printing surface D.

Then, the controller 60 judges whether or not the liquid layer to be formed is the last layer (Step S6). If the first liquid layer C1 is not the last liquid layer (Step S6: NO), the head unit 11 is moved rightwardly without conveying the printing medium A. Then, as shown in FIG. 4C, the controller 60 allows the head 20 to discharge the liquid therefrom while moving the head 20 leftwardly (Step S2). In this case, the surface of the first liquid layer C1 in the flow state on the opposing area A1 is designated as the printing surface D which is opposed to the discharge surface 20*a* of the head 20 moved leftwardly. On this account, the liquid is landed on the surface of the first liquid layer C1 as the printing surface D.

Further, the controller 60 acquires the state of the surface of the first liquid layer C1 as the printing surface D (Step S3), and the controller 60 acquires the first illuminance corresponding to this state on the basis of the predetermined relationship. The first illuminance decides the first added-up light amount (Step S4). The controller 60 radiates the light at the first illuminance onto the first liquid layer C1 while moving the energy applying unit 30 leftwardly while following the head 20 (Step S5). Accordingly, as shown in FIG. 4D, the liquid on the first liquid layer C1 receives the first added-up light amount corresponding to the surface state of the first liquid layer C1, and the second liquid layer C2 in the flow state is formed on the first liquid layer C1.

In this procedure, the first liquid layer C1 shown in FIG. 6A is in the flow state, and hence the second liquid layer C2, which is stacked thereon, easily spreads. On this account, the irregularities can be suppressed for the second liquid layer C2 as compared with the liquid layer which is formed on the liquid layer in the temporary cured state as shown in FIG. 6B. Accordingly, the scattered light on the surface of the second liquid layer C2 is suppressed as compared with the scattered light on the surface of the liquid layer shown in FIG. 6B.

Then, the controller 60 judges whether or not the liquid layer to be formed is the last liquid layer (Step S6). In this procedure, if the second liquid layer C2 is the last liquid layer (Step S6: YES), the controller 60 allows the energy applying unit 30 to radiate the light at the second illuminance therefrom (Step S7) without discharging the liquid from the head 20, while moving the head unit 11 rightwardly without conveying the printing medium A as shown in FIGS. 3 and 4D. Accordingly, the second added-up light amount is applied from the energy applying unit 30 to the first liquid layer C1 and the second liquid layer C2. Accordingly, as for the liquid of the first liquid layer C1 and the second liquid layer C2, the fluidity thereof lowers or disappears to cause the curing, and the liquid is fixed to the printing medium A. Thus, the image is printed on the printing medium A with the liquid.

As described above, when the image is printed on the opposing area A1 of the printing medium A in accordance with the scanning action, if the printing process based on the printing data is not terminated (Step S8: NO), then the controller 60 conveys the printing medium A frontwardly (Step S9). Accordingly, the discharge surface 20*a* of the head 20 moved leftwardly is opposed to the area A2 of the printing medium A disposed at the back of the opposing area A1. Then, the controller 60 executes the processes of Step S1 and the followings for the opposing area A2, and thus the image is printed. The scanning action and the conveyance action for the printing medium A are alternately repeated, and the image, which corresponds to the printing data, is printed on the printing medium A.

First Modified Embodiment

Figure 7A:
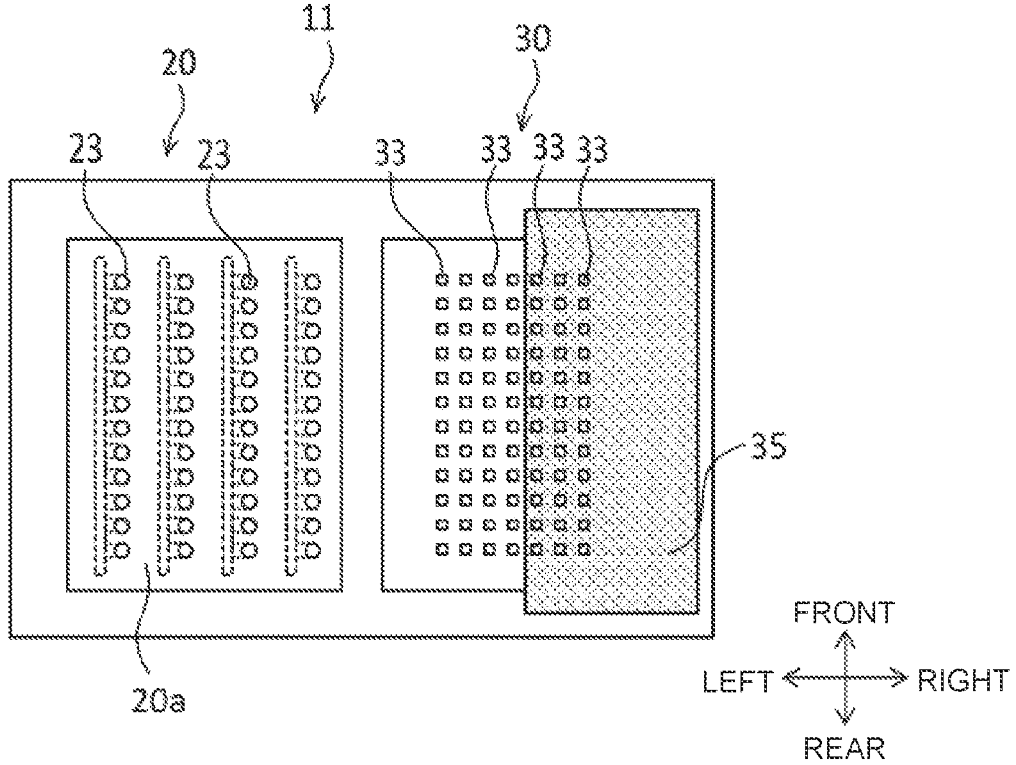
FIG. 7A is a schematic view as viewed from a lower position illustrative of the head unit in which light sources of an energy applying unit are covered with a filter.
Figure 7B:
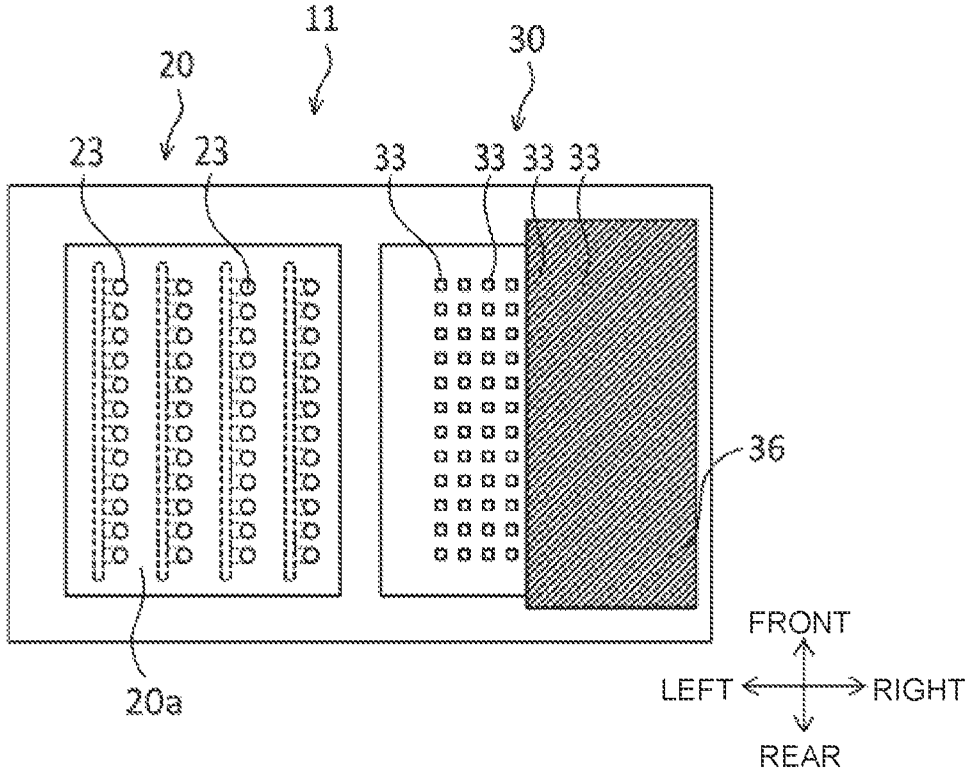
FIG. 7B is a schematic view as viewed from a lower position illustrative of the head unit in which the light sources of the energy applying unit are covered with a shutter.

In the embodiment described above, the controller 60 changes the number of the light sources 33 to be turned OFF when the light at the first illuminance is applied, depending on the decided first added-up light amount. In place thereof, as shown in FIGS. 7A and 7B, a printing apparatus 10 according to a first modified embodiment further comprises a filter 35 which lowers the intensity of the light to be transmitted, or a shutter 36 which shuts off the light to be transmitted. The controller 60 changes the number of the light sources 33 to be covered with the filter 35 or the shutter 36 when the light at the first illuminance is applied depending on the decided first added-up light amount.

In an exemplary case shown in FIG. 7A, the filter 35 has a rectangular flat plate shape. The filter 35 is an optical element such as a polarizing filter or the like which transmits the light having a predetermined property included in the incoming light and which absorbs or reflects the light other than the above so that the light other than the above is not transmitted. The filter 35 is arranged between the energy applying unit 30 and the stage 51 (FIG. 1) in the upward-downward direction so that the light sources 33 can be covered therewith.

The filter 35 has the length in the front-back direction which is longer than the length of the light source array in which the plurality of light sources 33 are aligned in the front-back direction in the energy applying unit 30. The front end of the filter 35 is arranged on the front side as compared with the frontmost light source 33 in the light source array and the back end of the filter 35 is arranged on the back side as compared with the backmost light source 33 in the light source array. Accordingly, the filter 35 can cover the light sources 33 in relation to every light source array.

The filter 35 is movable in the left-right direction by means of a filter actuator 37 shown in FIG. 2. The filter actuator 37 is connected to the controller 60 via a filter driving circuit 68. The movement of the filter actuator 37 is controlled by the controller 60.

All of the light sources 33 of the energy applying unit 30 are turned. ON. In this case, for example, when the filter 35 is arranged on the right side as compared with the arrangement range of the light sources 33 of the energy applying unit 30, then all of the light sources 33 of the energy applying unit 30 are not covered with the filter 35, and the light coming from all of the light sources 33 is radiated onto the printing medium A on the stage.

When the filter 35 is moved to the left side, the light sources 33 are covered with the filter 35 in relation to every light source array. The light, which comes from the covered light sources 33, is transmitted through the filter 35, and the intensity of the transmitted light is lowered. The light sources 33 other than the above are arranged on the left side as compared with the filter 35, and they are not covered with the filter 35. The intensity of the light thereof is not lowered.

Therefore, in accordance with the movement of the filter 35 to the left side to increase the number of the light sources 33 covered with the filter 35, the first illuminance of the light radiated from the energy applying unit 30 onto the printing medium A is lowered, and the first added-up light amount applied to the liquid is lowered. In this case, the filter 35 covers the light sources 33 in relation to every light source array of the energy applying unit 30 which is movable in the left-right direction. Therefore, it is possible to uniformly or equivalently radiate the light onto the liquid in the left-right direction and the front-back direction.

In an exemplary case shown in FIG. 7B, the shutter 36 is an optical element which does not transmit the light. The shutter 36 is movable in the left-right direction by means of a shutter actuator 38 shown in FIG. 2. The shutter actuator 38 is connected to the controller 60 via a shutter driving circuit 69, and the movement thereof is controlled by the controller 60.

The filter 35 transmits the light while lowering the intensity of the light. On the other hand, the shutter 36 shuts off the transmitting light. Other than this feature, the shutter 36 is configured in the same manner as the filter 35. Therefore, in accordance with the movement of the shutter 36 to the left side to increase the number of the light sources 33 covered with the shutter 36, the first illuminance of the light radiated from the energy applying unit 30 onto the printing medium A is lowered, and the first added-up light amount applied to the liquid is lowered. In this case, the shutter 36 covers the light sources 33 in relation to every light source array of the energy applying unit 30 which is movable in the left-right direction. Therefore, it is possible to uniformly or equivalently radiate the light onto the liquid in the left-right direction and the front-back direction.

Figure 8A:
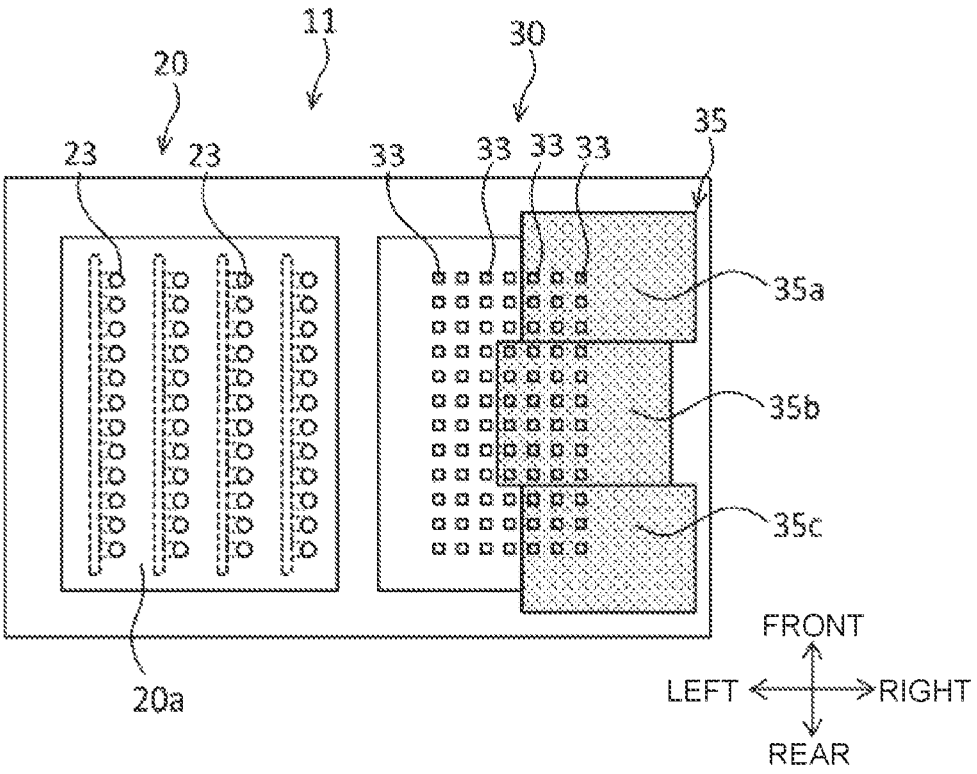
FIG. 8A is a schematic view as viewed from a lower position illustrative of the head unit in which the light sources of the energy applying unit are covered with a plurality of filter portions.

Note that as shown in FIG. 8A, the filter 35 may be divided into a plurality of (for example, three) filter portions 35*a*, 35*b*, 35*c*. In this case, the plurality of filter portions are arranged while being aligned in the front-back direction. Each of the filter portions is independently movable in the left-right direction by means of a filter actuator 37.

For example, the central filter portion 35*b*, which is included in the three filter portions and which is arranged between the front end filter portion 35*a* and the back end filter portion 35*c*, is arranged on the left side as compared with the front end filter portion 35*a* and the back end filter portion 35*c*. Accordingly, the number of the light sources 33 covered with the central filter portion 35*b* is larger than the number of the light sources 33 covered with the front end filter portion 35*a* and the number of the light sources 33 covered with the back end filter portion 35*c*. On this account, the intensity of the light radiated from the central portion of the energy applying unit 30 covered with the central filter portion 35*b* is decreased. The illuminance of the light radiated from the central portion onto the center of the printing surface D is decreased.

Figure 8B:
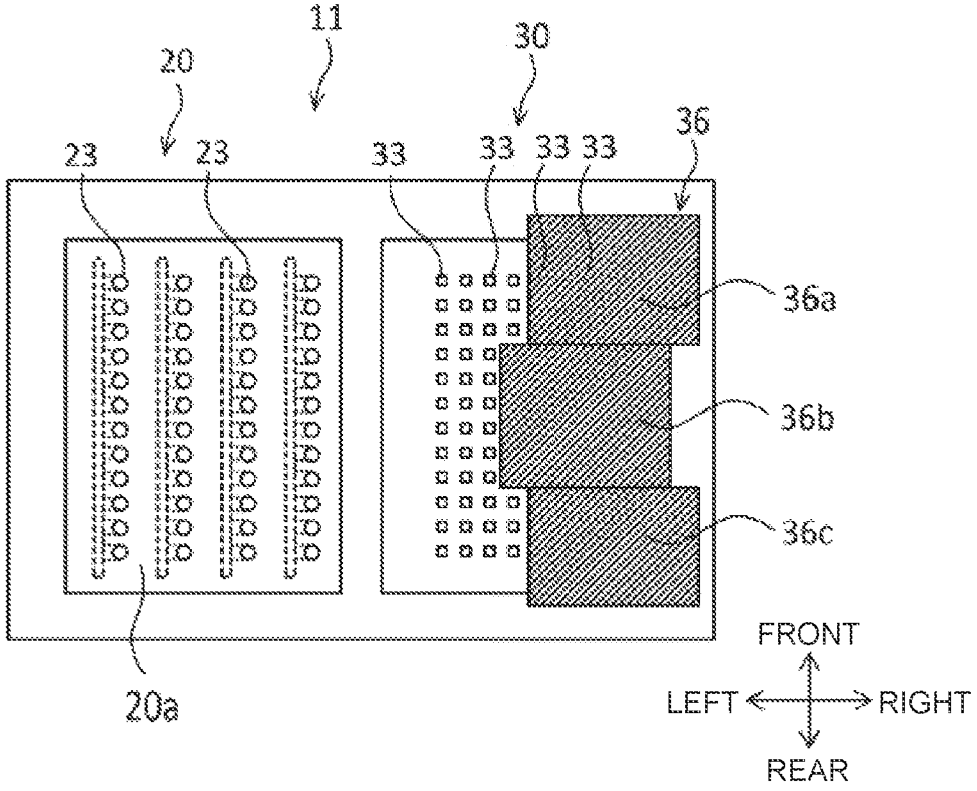
FIG. 8B is a schematic view as viewed from a lower position illustrative of the head unit in which the light sources of the energy applying unit are covered with a plurality of shutter portions.

On this account, the lights coming from the plurality of light sources 33 are superimposed at the center of the printing surface D, and the illuminance tends to increase. On the contrary, the intensity of the light radiated from the central portion of the energy applying unit 30 is decreased. Accordingly, it is possible to uniformize the illuminance of the light on the printing surface D. Note that as shown in FIG. 8B, the shutter 36 may be also divided into a plurality of shutter portions 36*a*, 36*b*, 36*c* in the same manner as the filter 35. Accordingly, it is possible to realize the uniform illuminance of the light on the printing surface D.

Second Modified Embodiment

In the embodiment described above, the controller 60 changes the number of the light sources 33 to be turned OFF when the light at the first illuminance is applied, depending on the decided first added-up light amount. In place thereof, in a printing apparatus 10 according to a second modified embodiment, the controller 60 changes the intensity of the light to be radiated from the light sources 33 when the light at the first illuminance is applied, depending on the decided first added-up light amount.

In this case, the light source 33 is a light-emitting element in which the intensity of the light to be radiated is changeable depending on the supplied electric power. As for the light-emitting element of the light source 33, the smaller the electric power to be supplied is, the smaller the intensity of the light to be radiated is. Accordingly, the first illuminance of the light radiated onto the liquid on the printing surface D is lowered, and the first added-up light amount applied to the liquid is decreased. The controller 60 controls the electric power supplied to the light sources 33 by means of the energy application driving circuit 64 shown in FIG. 2. The control includes, for example, control to change the intensity of the light in accordance with the PWM control.

In this way, the electric power supplied to the light sources 33 is adjusted, and thus it is possible to easily change the first added-up light amount applied to the liquid on the printing surface D from the energy applying unit 30. Further, all of the light sources 33 of the energy applying unit 30 may be collectively controlled, or the light sources 33 may be individually controlled. For example, when the intensity of the light source 33 is raised at positions nearer to the both ends in the front-back direction, it is contemplated to uniformize the illuminance on the printing surface D.

Third Modified Embodiment

Figure 9A:
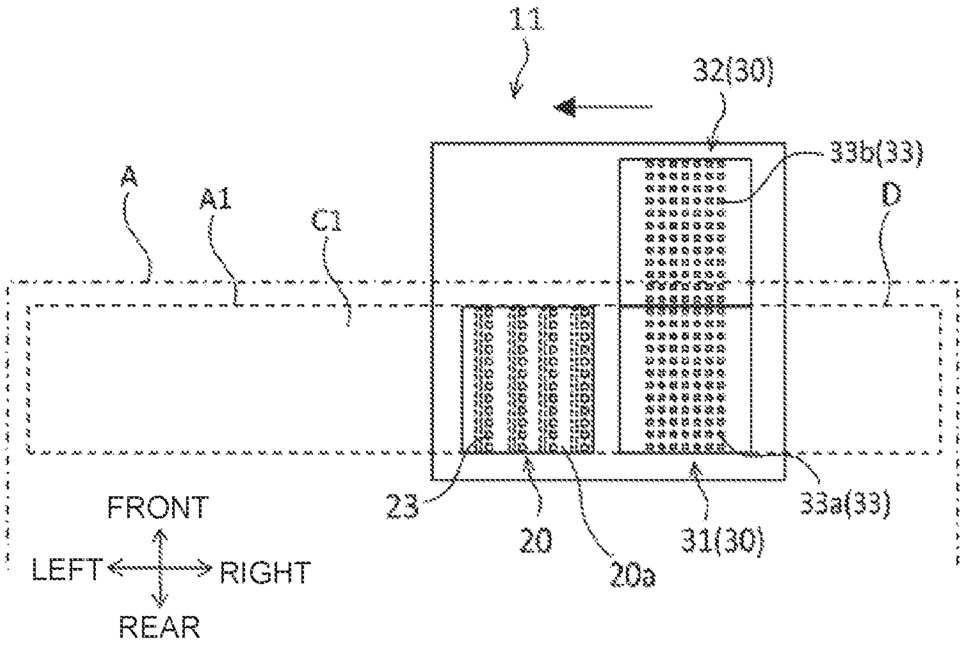
FIG. 9A is a draining schematically illustrative of a head unit in which a head and a first energy applying unit are opposed to an opposing area A1 of the printing medium.

In the printing apparatuses 10 of the embodiment and the first and second modified embodiments described above, the head unit 11 has one head 20 and one energy applying unit 30. On the other hand, in a printing apparatus 10 according to a third modified embodiment, as shown in FIG. 9A, a head unit 11 has one head 20 and two energy applying units 30.

Figure 9B:
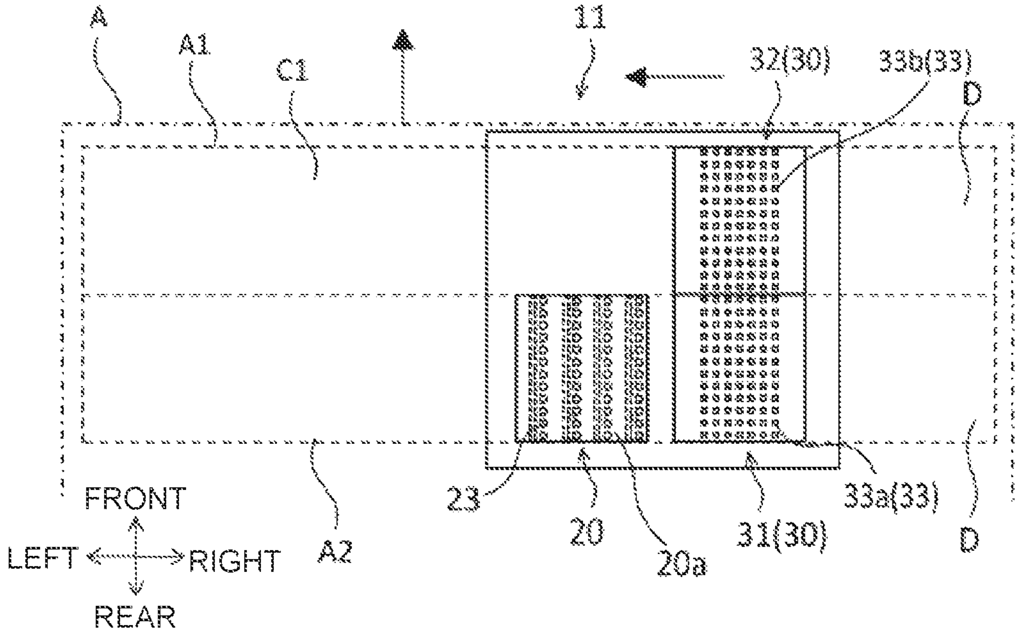
FIG. 9B is a drawing schematically illustrative of the head unit in which a second energy applying unit is opposed to an opposing area A2 of the punting medium.

In the exemplary case shown in FIG. 9, the energy applying unit 30 has the first energy applying unit 31 and the second energy applying unit 32. The first energy applying unit 31 is arranged at the back of the second energy applying unit 32 on the right side of the head 20. The light sources 33 include first light sources 33*a* of the first energy applying unit 31 and second light sources 33*b* of the second energy applying unit 32.

Figure 10:
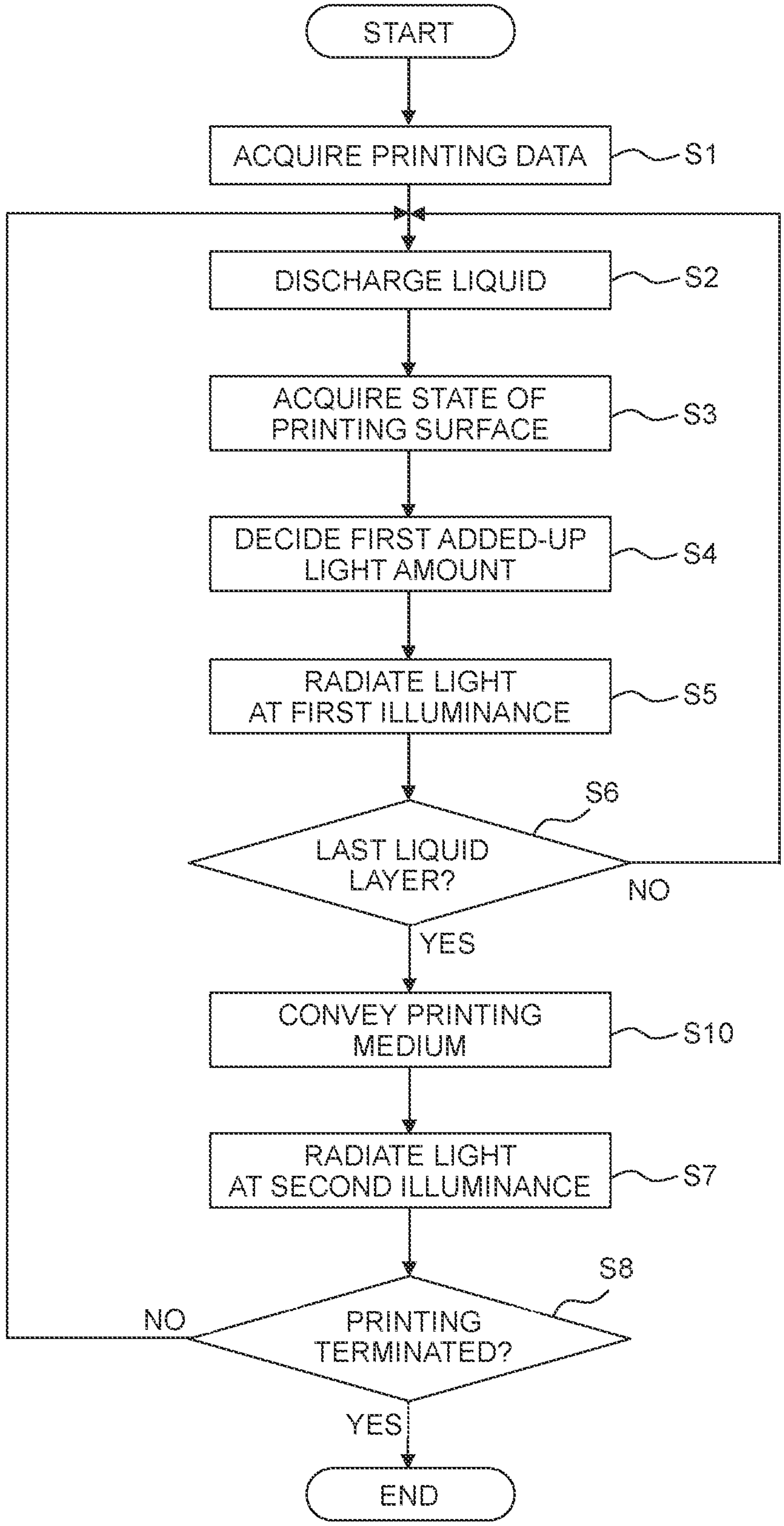
FIG. 10 is a flow chart illustrative of an exemplary control method for controlling a printing apparatus provided with the two energy applying units.

A method for controlling the printing apparatus 10 is executed by the controller 60 in accordance with, for example, a flow chart shown in FIG. 10. In FIG. 10, Step S9 shown in FIG. 5 is not executed, and a process of Step S10 is executed between Step S6 and Step S7 shown in FIG. 5. In Step S10, the printing medium is conveyed.

Specifically, as shown in FIG. 10, the controller 60 acquires the printing data (Step S1). The controller 60 allows the head 20 to discharge the liquid therefrom (Step S2), the head 20 being moved to the left side on the basis of the printing data. The liquid is landed on the opposing area A1 of the printing medium A as the printing surface D. Then, the controller 60 acquires the surface state of the printing medium A as the state of the printing surface D (Step S3), and the controller 60 decides the first added-up light amount corresponding to this state (Step S4).

The controller 60 allows the energy applying unit 30 to radiate the light at the first illuminance therefrom onto the liquid on the printing surface D (Step S5), the energy applying unit 30 following the head 20. Accordingly, the liquid on the printing surface D receives the first added-up light amount, and the liquid is in the flow state. The first liquid layer C1 in the flow state is formed in the opposing area A1.

If the first liquid layer C1 is not the last layer to be formed on the opposing area A1 (Step S6: NO), the controller 60 repeats the processes of Step S2 to Step S5 to form the liquid layer in the flow state in the opposing area A1. On the other hand, if the first liquid layer C1 is the last layer to be formed on the opposing area. A1 (Step S6: YES), the controller 60 conveys the printing medium A frontwardly as shown in FIG. 10B (Step S10). Accordingly, the first liquid layer C1 is opposed to the second energy applying unit 32 in the opposing area A1, and the printing medium A is opposed to the head 20 in the opposing area A2 disposed at the back of the opposing area A1.

Then, the controller 60 allows the second energy applying unit 32 to radiate the light at the second illuminance therefrom (Step S7), while moving the head unit 11 leftwardly after returning the head unit 11 to the right side. Accordingly, in the opposing area A1, the first liquid layer C1 receives the second added-up light amount, and the first liquid layer C1 is cured. The image is printed on the opposing area A1.

Further, if the printing process is not terminated (Step S8: NO), the controller 60 allows the head 20 to discharge the liquid therefrom (Step S2). Then, the controller 60 acquires the state of the surface of the printing medium A in the opposing area A2 as the state of the printing surface D (Step S3). After that, the controller 60 decides the first added-up light amount corresponding to this state, and then the controller 60 allows the first energy applying unit 31 to radiate the light at the first illuminance therefrom (Step S5). Accordingly, in the opposing area A2, the liquid is landed on the printing medium A as the printing surface D, and then the light at the first illuminance is radiated onto the liquid. The first liquid layer C1 in the flow state is formed on the printing surface D. If the first liquid layer C1 is not the last layer to be formed on the opposing area A1 (Step S6: NO), then the processes of Step S10 and the followings are executed, and the image is printed on the opposing area A2.

As described above, the head unit 11 has one head 20, the first energy applying unit 31, and the second energy applying unit 32. Accordingly, it is possible to simultaneously perform the curing of the liquid layer in the opposing area A1 by means of the radiation of the light having the second illuminance while moving the head unit 11, and the formation of the liquid layer in the flow state in the opposing area A2 by means of the radiation of the light having the first illuminance.

Other Modified Embodiments

In all of the embodiment and the modified embodiments described above, the first added-up light amount is adjusted by the first illuminance depending on the state of the printing surface D. However, the first added-up light amount may be adjusted by the radiation time depending on the state of the printing surface D. For example, the controller 60 finds the movement speed corresponding to the state of the printing surface D on the basis of the predetermined correspondence relation in which the state of the printing surface D and the movement speed of the head unit 11 are correlated with each other. In this case, the slower the movement speed of the head unit 11 is, the longer the radiation time of the light from the energy applying unit 30 of the head unit 11 to the liquid is, the more increased the first added-up light amount applied to the liquid is.

In all of the embodiment and the modified embodiments described above, the controller 60 allows the energy applying unit 30 to radiate the light having the second illuminance therefrom without discharging the liquid from the head 20, while moving the head unit 11 rightwardly after forming the second liquid layer C2 in the flow state. However, the controller 60 may allow the energy applying unit 30 to radiate the light having the second illuminance therefrom without discharging the liquid from the head 20, while moving the head unit 11 leftwardly after moving the head unit 11 rightwardly after forming the second liquid layer C2 in the flow state.

In all of the embodiment and the modified embodiments described above, the moving device 40 relatively moves the printing medium A and the head unit 11 by moving the head unit 11 with respect to the printing medium A without moving the printing medium A in the left-right direction. On the other hand, the moving device 40 may relatively move the printing medium A on the stage 51 and the head unit 11 by moving the stage 51 with respect to the head 20 without moving the head 20 in the left-right direction. Further, the moving device 40 may relatively move the printing medium A on the stage 51 and the head unit 11 by moving the head 20 and the stage 51 in the left-right direction.

In all of the embodiment and the modified embodiments described above, the piezoelectric element is used for the driving element 25. However, there is no limitation thereto. For example, a thermal actuator such as a heating resistor or the like for generating bubbles and an electrostatic actuator such as an electrode or the like for generating the electrostatic force may be used for the driving element 25.

Note that all of the embodiments described above may be combined with each other provided that one embodiment mutually excludes another embodiment. Further, according to the foregoing explanation, many improvements and other embodiments of the present disclosure are clear for those skilled in the art. Therefore, the foregoing explanation should be interpreted merely by way of example. The foregoing explanation is provided in order to teach the best mode for carrying out the present disclosure to those skilled in the art. Details of the structure and/or the function can be substantially changed without deviating from the spirit of the present disclosure.

The printing apparatus according to the present disclosure is useful, for example, as the printing apparatus which makes it possible to suppress the deterioration of the image quality caused by the bleeding or blurring and the irregularities.

What is claimed is:

1. A printer comprising:

a head configured to discharge a liquid onto a printing surface of a printing medium, the liquid being curable by applying energy;

an energy applying unit configured to apply energy to the liquid;

a moving device configured to relatively move the head and the energy applying unit with respect to the printing medium; and a controller configured to execute:

causing the head to discharge the liquid onto the printing surface while relatively moving the head and the printing medium;

causing the energy applying unit to apply first energy to the liquid so that the liquid is in a flow state in which the liquid has an increased viscosity and the liquid has fluidity, while relatively moving the energy applying unit and the printing medium;

causing the energy applying unit to apply second energy to the liquid so that the liquid, to which the first energy has been applied, is cured, while relatively moving the energy applying unit and the printing medium; and determining an added-up energy amount of the first energy applied to the liquid on the printing surface from the energy applying unit until the second energy is applied after applying the first energy, depending on a state of the printing surface.

2. The printer according to claim 1, wherein the printing surface is one of a surface of the printing medium, a surface of a coating on the printing medium, and a surface of a layer, among one layer or a plurality of layers of the liquid in the flow state on the printing medium, opposed to the head.

3. The printer according to claim 2, wherein the printing surface has a state which is changeable depending on a quality of material of the printing medium when the printing surface is the surface of the printing medium, wherein the printing surface has a state which is changeable depending on a quality of material of the coating when the printing surface is the surface of the coating on the printing medium, and wherein the printing surface has a state which is changeable depending on a quality of material of the layer of the liquid when the printing surface is the surface of the layer of the liquid on the printing medium.

4. The printer according to claim 1, wherein the controller operates, when the added-up energy amount is determined, such that the added-up energy amount, which is applied to the liquid on the printing surface that is in a first state as the state, is larger than the added-up energy amount which is applied to the liquid on the printing surface that is in a second state as the state in which the liquid hardly spreads as compared with the printing surface in the first state.

5. The printer according to claim 1, wherein the energy applying unit includes a plurality of light sources configured to radiate light as the energy, and wherein the controller is configured to change a number of the light sources which are turned OFF when the first energy is applied, depending on the decided added-up energy amount.

6. The printer according to claim 1, wherein the energy applying unit includes a plurality of light sources configured to radiate light as the energy, wherein the energy applying unit further includes one of a filter configured to lower an intensity of the light to be transmitted and a shutter configured to shut off the light to be transmitted, and wherein the controller is configured to change a number of the light sources to be covered with one of the filter and the shutter when the first energy is applied, depending on the decided added-up energy amount.

7. The printer according to claim 1, wherein the energy applying unit includes a light source configured to radiate light as the energy, and wherein the controller is configured to change an intensity of the light radiated from the light source when the first energy is applied, depending on the decided added-up energy amount.

8. The printer according to claim 1, wherein the energy applying unit includes a first energy applying unit configured to apply the first energy to the liquid and a second energy applying unit configured to apply the second energy to the liquid, the first energy applying unit and the second energy applying unit being aligned in a first direction, wherein the first energy applying unit is aligned with the head in a second direction orthogonal to the first direction, wherein the moving device includes a conveyor configured to convey the printing medium in the first direction, and a carriage configured to move the head the first energy applying unit, and the second energy applying unit in the second direction, and wherein the controller is configured to execute:

causing the head to discharge the liquid onto the printing surface and causing the first energy applying unit to apply the first energy to the liquid on the printing surface, while causing the carriage to move in the second direction;

causing the conveyor to convey the printing medium in the first direction; and causing the second energy applying unit to apply the second energy to the liquid on the printing surface, while causing the carriage to move in the second direction.

* * * * *